United States Patent
Frutschi et al.

(10) Patent No.: US 7,089,743 B2
(45) Date of Patent: Aug. 15, 2006

(54) METHOD FOR OPERATING A POWER PLANT BY MEANS OF A $CO_2$ PROCESS

(75) Inventors: Hans Ulrich Frutschi, Rinikon (CH); Hans Wettstein, Fislisbach (CH)

(73) Assignee: ALSTOM, Paris (FR)

(*) Notice: Subject to any disclaimer, the term of this patent is extended or adjusted under 35 U.S.C. 154(b) by 0 days.

(21) Appl. No.: 10/852,656

(22) Filed: May 25, 2004

(65) Prior Publication Data

US 2005/0076645 A1    Apr. 14, 2005

Related U.S. Application Data

(63) Continuation of application No. 09/255,712, filed on Feb. 23, 1999, now abandoned.

(30) Foreign Application Priority Data

Feb. 25, 1998   (EP)   ................... 98810154

(51) Int. Cl.
    *F02C 1/00*   (2006.01)
(52) U.S. Cl. ....................... 60/772; 60/39.52
(58) Field of Classification Search .............. 60/39.02, 60/39.52, 39.461, 772
    See application file for complete search history.

(56) References Cited

U.S. PATENT DOCUMENTS

| | | | |
|---|---|---|---|
| 4,498,289 A | 2/1985 | Osgerby | |
| 5,175,995 A | 1/1993 | Pak et al. | |
| 6,250,073 B1 | 6/2001 | Zimmer et al. | |
| 6,269,624 B1 * | 8/2001 | Frutschi et al. ............... | 60/783 |

FOREIGN PATENT DOCUMENTS

| | | |
|---|---|---|
| DE | 36 43 401 A1 | 6/1988 |
| DE | 39 24 908 A1 | 1/1991 |
| DE | 43 03 174 A1 | 8/1994 |
| DE | 44 07 619 C1 | 6/1995 |
| EP | 0 620 362 A1 | 10/1994 |
| EP | 0 767 290 A1 | 4/1997 |
| FR | 2 202 231 | 5/1974 |
| JP | 04279729 | 10/1992 |
| WO | 95/02115 | 1/1995 |
| WO | 97/44574 | 11/1997 |

OTHER PUBLICATIONS

Yulin Shao et al., "Natural Gas Fired Combined Cycle Power Plant With $CO_2$ Capture", Energy Conversion and Management, Dec. 1995, No. 12, pp. 1115-1128.

* cited by examiner

Primary Examiner—William H. Rodriguez
(74) Attorney, Agent, or Firm—Buchanan Ingersoll PC

(57) ABSTRACT

In a method for operating a power plant by means of a $CO_2$ process, isentropic compression first takes place, subsequently an isobaric heat supply, then isentropic expansion, and finally isobaric heat discharge. The $CO_2$ process broken down here takes place with internal combustion, a fuel (21) and the oxygen (18) necessary for oxidization being supplied. After the charging of the $CO_2$ circuit (23) has been carried out, the excess $CO_2$ formed from combustion is discharged continuously, in that this gas is led through a cooler (14), in which said gas is condensed. In order to dispose of this condensed $CO_2$ (15), there are available here, for example, the possibilities of storing this $CO_2$ on the ocean floor or of introducing the condensed $CO_2$ into a worked-out deposit of natural gas.

8 Claims, 9 Drawing Sheets

US 7,089,743 B2

METHOD FOR OPERATING A POWER PLANT BY MEANS OF A CO₂ PROCESS

This application is a continuation of U.S. patent application Ser. No. 09/255,712 filed Feb. 23, 1999 now abandoned, which claims priority under 35 U.S.C. §§119 to EP 98 810 154.9 filed in Europe on Feb. 25, 1998; the entire content of which is hereby incorporated by reference.

BACKGROUND OF THE INVENTION

1. Field of the Invention

The present invention relates to a method for operating a $CO_2$ plant according to the preamble of claim 1. The invention also relates to setups for carrying out this method.

2. Discussion of Background

Internal combustion engines burn their fuel in compressed atmospheric air and mix their combustion gases intimately with this air and with the residual oxygen which has not been utilized. At the same time, the fuels, which almost always contain carbon, generate, inter alia, $CO_2$ which is a greenhouse gas. Extended use of fossil fuels nowadays releases $CO_2$ quantities which are internationally recognized as a risk to the world climate. An intensive search for $CO_2$-free technologies is therefore already in progress.

The supply of energy is, at the present time, determined by the use of fossil fuel energies in internal combustion engines, the highly diluted $CO_2$ being disposed of into the atmosphere.

It would be obvious to separate the $CO_2$ from the exhaust gases and dispose of it by condensation, separation and sealing it off from the atmosphere. However, the large volume flow makes it impossible to put such a procedure into practice.

Another known possibility is for cooled exhaust gases to be recirculated into the intake of internal combustion engines. This can be carried out to such an extent that the oxygen in the air is just used up. In this case, however, the exhaust gas still remains mixed with the atmospheric nitrogen and the $CO_2$ separation problem is therefore only marginally reduced.

Furthermore, all air-operated internal combustion engines also generate nitric oxides which act as air pollutants and the production of which requires costly measures to combat it.

SUMMARY OF THE INVENTION

Accordingly, one object of the invention, as defined in the claims, is to provide a novel method and a setup of the type initially mentioned, to dispose in an environmentally friendly way of the $CO_2$ which occurs, and, at the same time, here, the object of the invention is to eliminate the atmospheric nitric oxides which likewise occur.

The essential advantages of the invention are to be seen in that a method is proposed here, in which the $CO_2$ is discharged in pure form and under pressure for the purpose of subsequent condensation.

In this case, the method proceeds from a $CO_2$ process with internal combustion, in which, in order to heat the $CO_2$ mass located in the circuit, said heating preferably being carried out by means of a gaseous fuel, only that necessary oxygen quantity which is required for oxidizing this very fuel is supplied.

The degree of charging and, consequently, the power of the process can be regulated continuously by means of an appropriate extraction of $CO_2$ from the circuit at a suitable point.

Subsequently, by condensing out the $CO_2$ separated from the process, that state of aggregation of this gas is then brought about, at which the $CO_2$ occurring can easily be disposed of in an environmentally friendly way, particularly as regards the greenhouse problem.

Another essential advantage of the invention is to be seen in that the method can be carried out by means of several types of gas turbine setups, the setup described in each case constituting a specific optimum solution as a function of the predetermined parameters.

Another essential advantage of the invention is to be seen in that it provides a remedy against the fact that all air-breathing internal combustion engines also generate nitric oxides which act as air pollutants and the production of which requires costly measures to combat it, not least in light of the internationally restrictive laws on permissible pollutant emissions. Since no atmospheric nitrogen enters the flame in the recirculation mode with pure oxygen, $NO_x$ is also not generated. Admittedly, if the fuel carries bound nitrogen with it, a slight formation of $NO_x$ must be expected. However, since the excess gas represents a much smaller quantity than the exhaust gas in the air mode, its retreatment is simpler and less expensive.

Advantageous and expedient developments of the solutions according to the invention for achieving the object are defined in the further claims.

Exemplary embodiments of the invention are explained in more detail below with reference to the drawings. All the features not essential for an immediate understanding of the invention have been omitted. Identical elements are given the same reference symbols in the various figures. The direction of flow of the media is indicated by arrows.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
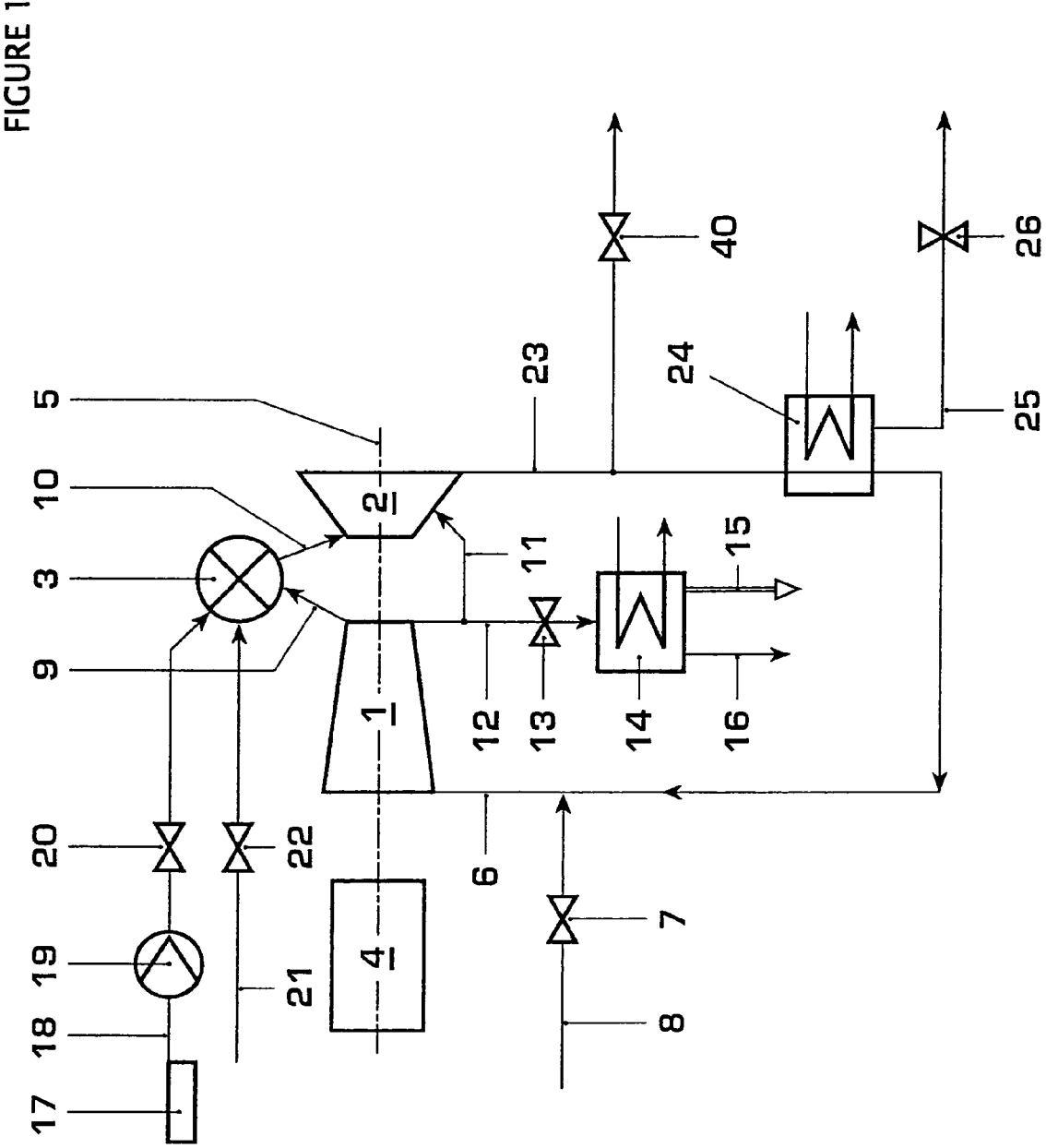
FIG. 1 shows a gas turbine with a closed circuit, with heat exchangers for the separation of water and $CO_2$.

Referring now to the drawings, wherein like reference numerals designate identical or corresponding parts throughout the several views, FIG. 1 shows a gas turbine with a closed circuit. This gas turbine or gas turbo set consists, in terms of assemblies, of a compressor unit 1, of a generator 4 coupled to this compressor unit, of a turbine 2 coupled to the compressor unit and of a combustion chamber 3 acting between the compressor unit 1 and turbine 2. The turbomachines 1 and 2 can be coupled by means of a common shaft 5. The circuit medium 6, which is sucked in by the compressor unit 1 and which is predominantly $CO_2$, flows, after compression has taken place, into the combustion chamber 3, in which the heat treatment of this medium is carried out, said medium then acting as hot gases 10 on the turbine 2. For startup, the compressor unit 1 may also, via a starting flap 7, suck in air 8, the nitrogen of which is discharged successively via an outlet flap 40 as said nitrogen is displaced by $CO_2$ which occurs. Whilst, after compression, the main fraction of the compressed circulation gas 9 is supplied to the combustion chamber 3, as already stated, a first secondary stream 11 is introduced as a coolant into the cooling paths of the assemblies to be cooled. Here, in this setup, the combustion chamber 3 and turbine 2 are the components primarily to be cooled, and cooling can be carried out in closed and/or open flow paths. A second secondary stream 12 of the order of magnitude of 4–8% of the entire compressed circulation gas is additionally branched off. In this case, this compressed $CO_2$ has the pressure which is necessary for condensation. Via a valve 13, which performs the function of an excess gas valve, this $CO_2$ fraction is discharged from the closed circuit. This circulation gas consists predominantly of $CO_2$, but may possibly also contain parasitic gases which have been entrained with the oxygen and fuel and, during startup, with air, as well as transformation products of said gases, for example $NO_x$. After the $CO_2$ has condensed in a cooler 14, this condensed $CO_2$ mass flow 15 is discharged in order to be disposed of, for example and/or preferably on the ocean floor or into a worked-out deposit of natural gas.

This disposal at a suitable location by suitable means constitutes a quick and lasting solution to the problem of the greenhouse effect caused by the constant emission of gaseous $CO_2$ into the atmosphere. In addition, the parasitic gases are likewise separated in cooperation with said cooler 14, and this very small mass flow 16 may be subjected to further separation or be discharged into the atmosphere. As regards the operation of the combustion chamber 3, the oxygen quantity 18 produced in an air separation plant 17 is recompressed in a compressor 19 and introduced via a regulating member 20 to the combustion chamber 3. In parallel with this, a fuel 21, which is appropriately coordinated via a regulating member 22 and which is preferably natural gas, or else other hydrocarbons or CO or mixtures of these, also flows into the combustion chamber 3, the heat treatment of the compressed circulation gas 9 being carried out by means of the added oxygen quantity 18. The hot gas coming from the combustion chamber is subsequently expanded into the downstream turbine 2. In respect of the closed circuit shown here, the exhaust gases 23 flowing out of the turbine 2 are led through a heat exchanger 24 before being supplied once again for the compression which has already been described. The water 25 which occurs is separated from this heat exchanger 24 via a regulating member 26.

The setup shown here is, strictly, a quasi closed circuit which is designed to be pressure resistant, vacuum resistant circuit routing also being possible in various operating modes. By the excess gas valve 13 being throttled or opened, the circuit is charged or discharged automatically, the circulating mass flow and the power increasing correspondingly. When this valve 13 is opened, the pressure in the circuit falls, and the vacuum may be generated in the return. The plant has approximately constant efficiency in the entire pressure mode, that is to say in a design pressure range with respect to the return of 0.5 to 5 bar in the power range of 10–100%. In the lower pressure range, the condensation temperature in the heat exchanger 24 falls, thus also causing the efficiency to rise slightly. The undesirable power losses which are known from stationary gas turbines and which occur with an increasing installation height and an increasing intake temperature are thereby avoided. If the plant is possibly operated with the excess being discharged into the atmosphere, overall efficiency is further improved by also utilizing its excess pressure in a turbine with additional power output. In this respect, reference is made in detail to the description of the following figures.

Figure 2:
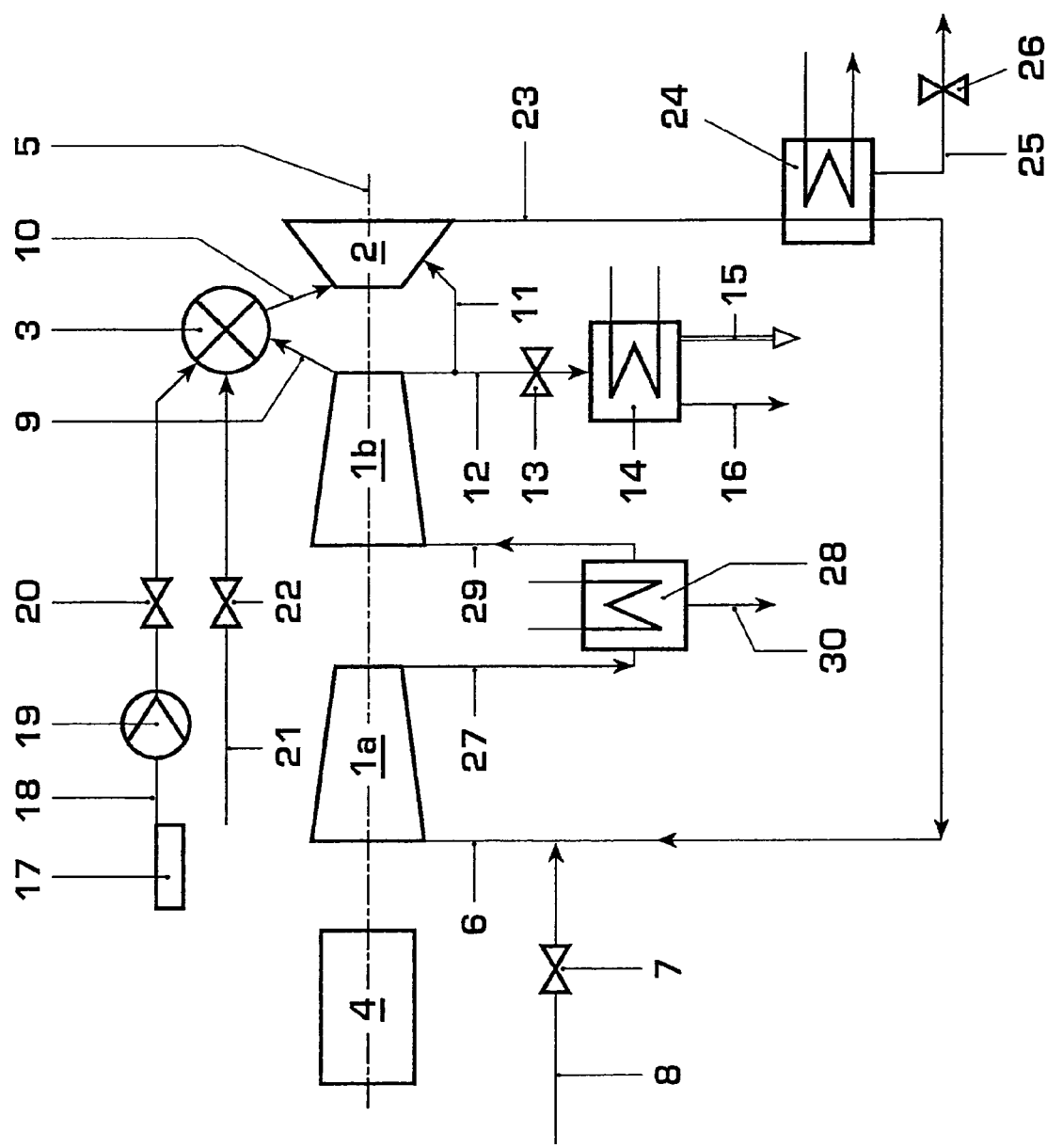
FIG. 2 shows a gas turbine according to FIG. 1 with additional compression intermediate cooling.

FIG. 2 differs from FIG. 1 in that, here, one or more intermediate cooling stages are carried out in cooperation with compression. Such intermediate cooling stages during compression are considered to be process improvements which are provided for the purpose of an efficiency rise and/or a power increase. In this case, intermediate cooling results in a flattening of the efficiency curve and is particularly useful in plants with high pressure ratios. The intermediate cooling illustrated here is the simplest possible setup, in that the circulation medium 6 to be compressed flows, downstream of a first precompressor stage 1a/27, through an intermediate cooler 28. The intermediately compressed and cooled medium 29 is subsequently finish compressed in a second compressor stage 1b. This intermediate cooling may also be designed in such a way that a condensed part quantity 30 of the $CO_2$ can already be discharged here. Further intermediate cooling, which results in a considerable rise in the efficiency of the plant and better condensing-out of the $CO_2$ to be discharged, can be achieved by aiming for isothermal or quasi-isothermal cooling in the region of the compression process. For this purpose, water injections are carried out in the compressor, these being arranged in each case in the plane of the guide blading and extending over the entire height of the compressor duct through which the flow passes. This measure makes it possible to dispense with additional components having pressure losses, this precaution resulting in the possibility of injecting the water according to the particular flow. These water injections are maintained, in terms of quantity, in such a way that water is added in each case to the compression process only to an extent such that the steam/$CO_2$ mixture which occurs does not exceed the water saturation line during compression, and that the intermediately compressed $CO_2$ is cooled down until at least all the injected water condenses out and, after being purified, can be used again as injection water. This procedure makes it possible to have virtually no water consumption. The remaining method steps of this setup according to FIG. 2 correspond to the statements made with regard to FIG. 1.

Figure 3:
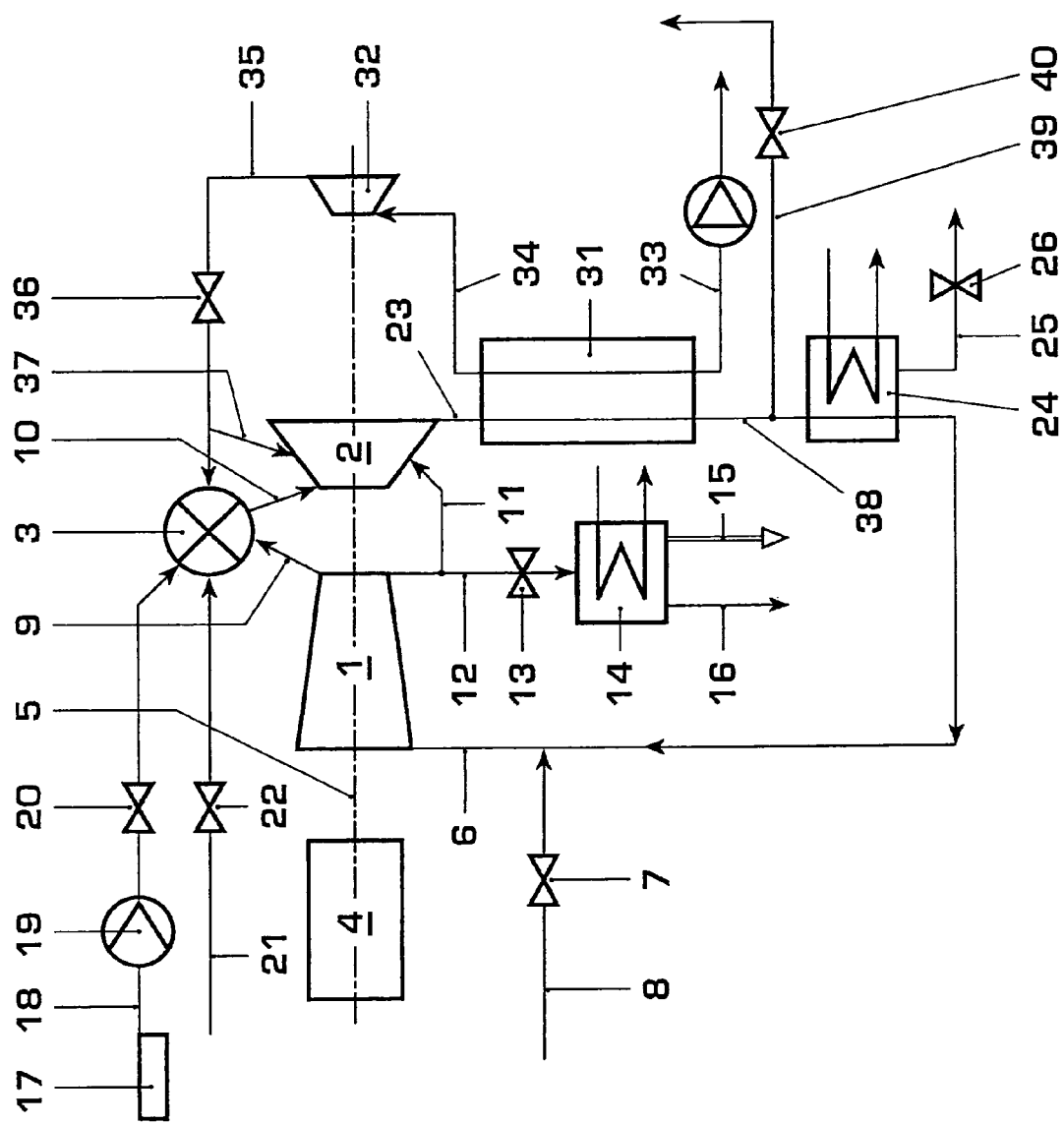
FIG. 3 shows a gas turbine with a closed circuit and with a steam circuit.

FIG. 3 shows a gas turbo set with a steam circuit. Here too, an essential feature of this setup is that the gas turbo set operates in a closed circuit. The exhaust gases 23 from the turbine 2 flow through a waste-heat steam generator 31, in which the counterflow of a water quantity 33 provided by a feed pump generates a steam quantity 34 which is used mainly for acting on a steam turbine 32. The expanded steam is subsequently introduced via a regulating member 36 into the combustion chamber 3, and, if required, a part quantity 37 of this expanded steam is branched off downstream of said regulating member 36 and introduced into the turbine 2. This introduction is preferably employed for cooling the parts of this turbomachine which are subjected to high thermal load and is then fed into the flow. The turbine power thereby rises, and the circulation gas, here $CO_2$, additionally enriched with steam, generates additional steam, with the result that the power density, in turn, rises sharply. Finally, if the entire steam 34 from the waste-heat steam generator 31 is injected into said assemblies of the gas turbo set, there is in the end no need for said steam turbine 32, and the plant becomes simpler and more cost-effective, with an efficiency which is only a few percentage points lower. Reference is made here, in particular, to setups with STIG. At the same time, the efficiency can be further improved if the steam in the waste-heat steam generator 31 is generated at as high a pressure as possible and is discharged via a steam turbine with power output to the main shaft 5 of the gas turbo set or to a separate generator not illustrated in any more detail. Such a setup is shown and described in more detail with reference to FIGS. 5 and 6. A part quantity 39 of the circulation gas 38 cooled in the waste-heat steam generator 31, said part quantity being regulated via an outlet flap 40, is branched off upstream of the heat exchanger 24 belonging to the closed or quasi closed circuit.

Figure 4:
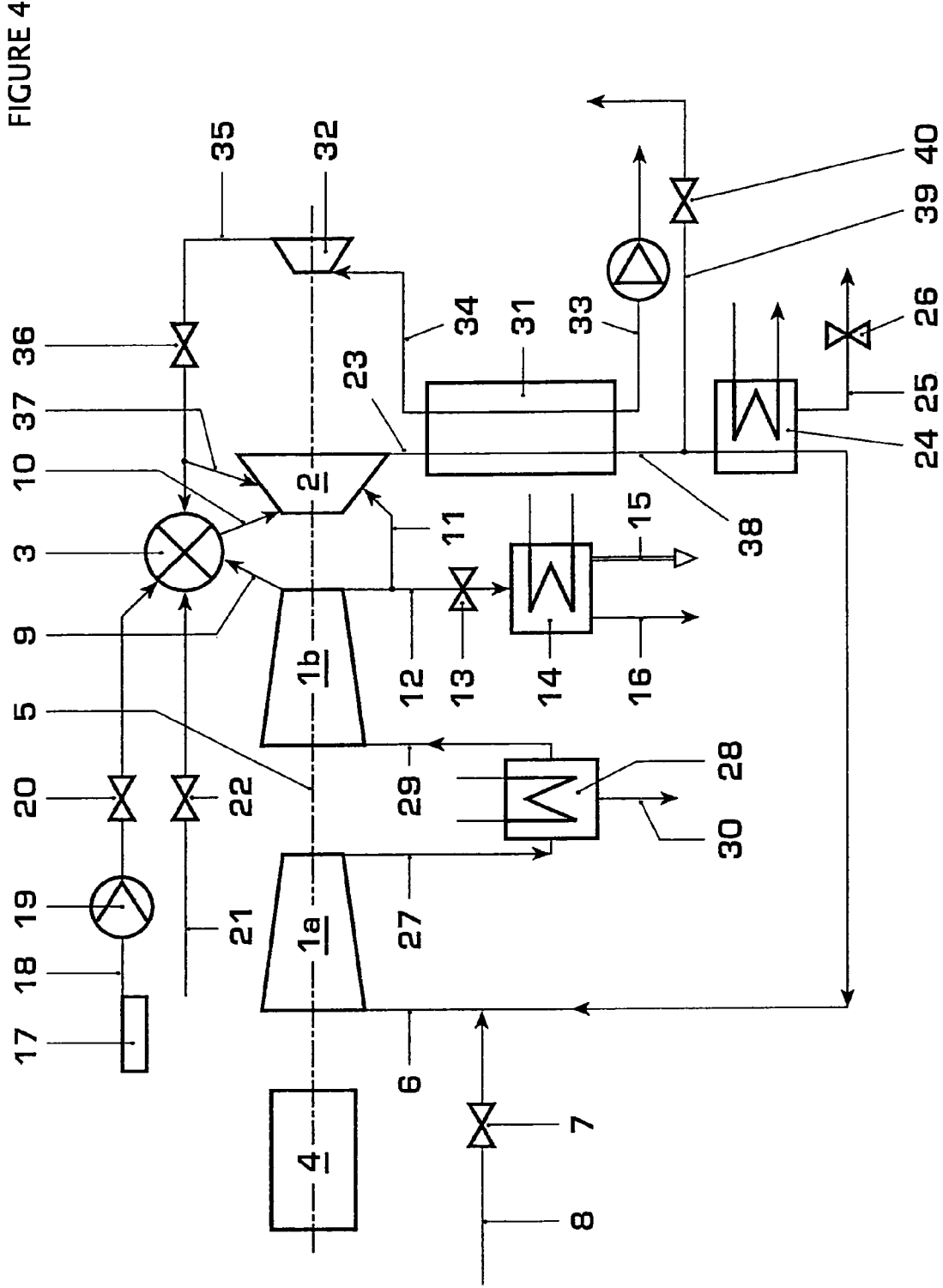
FIG. 4 shows a setup according to FIG. 3 with additional compression intermediate cooling.

FIG. 4 starts from a basic setup according to FIG. 3 and, as regards intermediate cooling in the region of the compressor unit 1, follows FIG. 2. The statements made in respect of the two figures mentioned are also applicable here and are an integral part of this FIG. 4.

Figure 5:
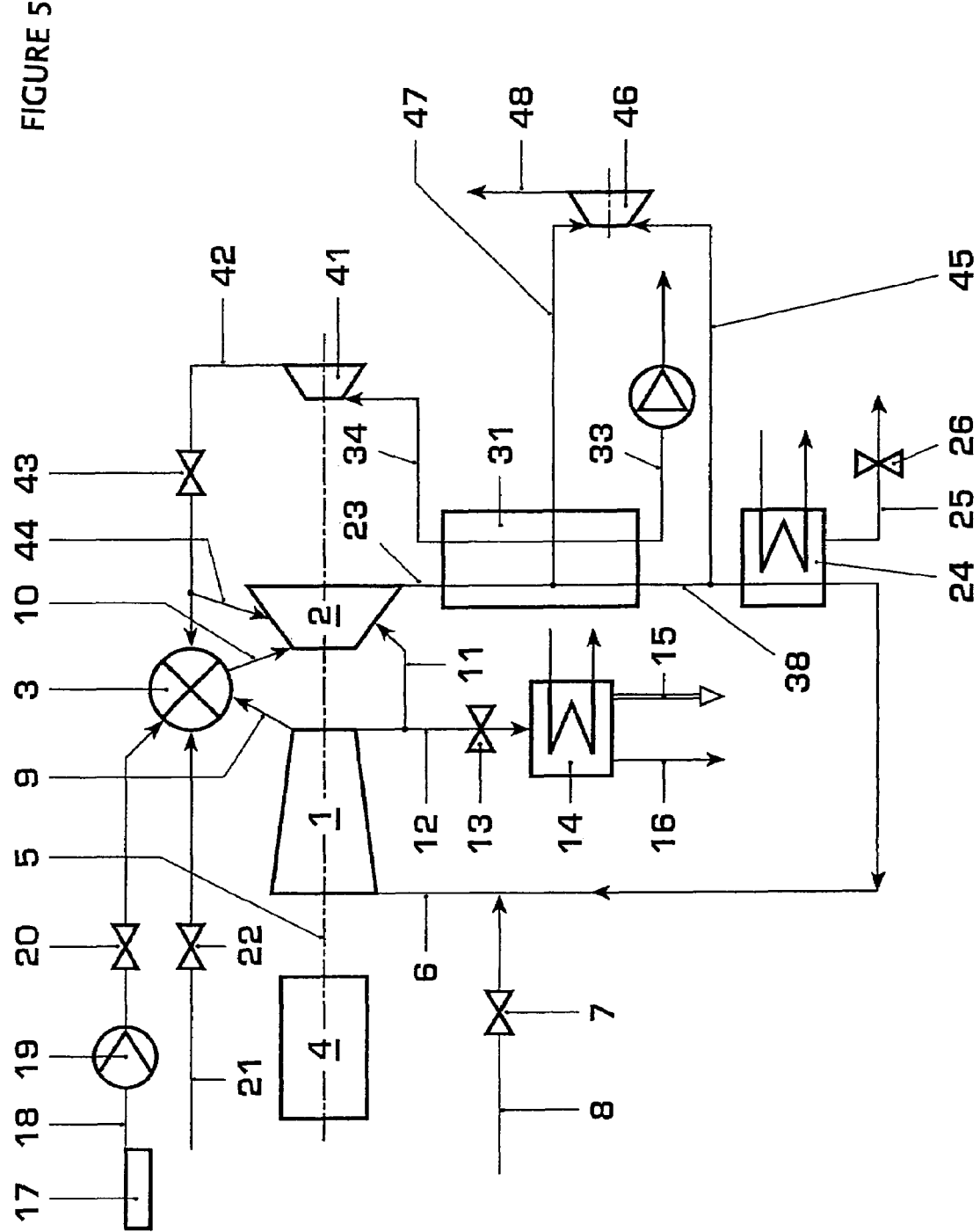
FIG. 5 shows a setup according to FIG. 3, a plurality of steam turbines being integrated into the steam circuit.

FIG. 5 is based closely on FIG. 3, here the steam turbine 41, operating in cooperation with the waste-heat steam generator 31, being coupled to the main shaft 5 of the gas turbo set, the power output taking place directly. The steam 42 expanded from this steam turbine 41 is introduced (reference 44) via a regulating member 43 into the combustion chamber 3 and/or into the turbine 2. The power density thereby rises sharply. This steam may, of course, also be introduced at other locations in the circuit of the gas turbo set. Furthermore, it is possible, by means of this steam 42, for those parts of said assemblies 2/3 which are subjected to high thermal load to be cooled in the closed and/or open flow path. In this case, it must be said that the steam 34 can be generated directly at the necessary pressure or else can be expanded to a higher pressure and then, via the regulating member 43 already mentioned or correspondingly via the steam turbine 41, to the pressure level required for injection. The setup shown here has, for the charged mode, additional extraction of an exhaust gas quantity 47 from the waste-heat steam generator 31 and extraction of a further exhaust gas quantity 45 downstream of the waste-heat steam generator 31. Both exhaust gas quantities 45/47 act on an expander 46 and, after this, are discharged 48, their reuse being ensured specifically in each individual case. For example, an optimum pressure for charging the circuit can be set via this expander 46, and, in such a case, quantity regulation must be provided. By means of this pressure regulation, if required, interdependent regulation of the pressure of the main steam quantity 34 can also be achieved.

The setup just described may also be designed along the lines of a combined plant, the gas turbine circuit shown according to this FIG. 5, whether with or without intermediate cooling, forming the basic setup for a combined plant, one of these being disclosed in EP-0,767,290 A1, and this publication forming an integral part of the present description.

Figure 6:
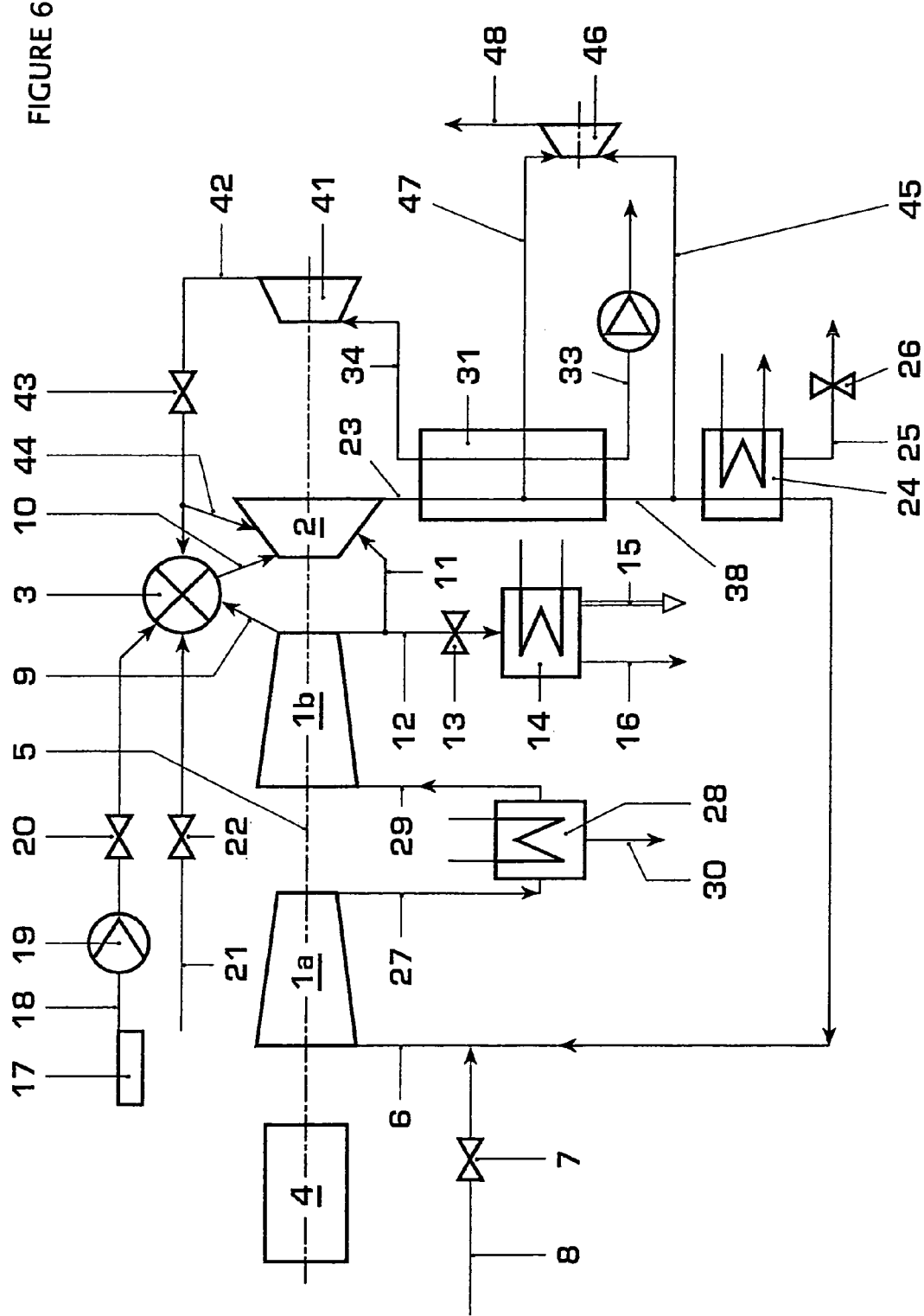
FIG. 6 shows a setup according to FIG. 4, a plurality of steam turbines being integrated into the steam circuit.

FIG. 6 starts from a basic setup according to FIG. 5 and, as regards intermediate cooling in the region of the compressor unit 1, follows FIG. 2. The statements made with regard to the two figures mentioned are also applicable here and are an integral part of this FIG. 6.

The gas turbo set according to one of FIGS. 1 to 6 can be readily replaced by a sequentially fired plant according to EP-0,620,362 A1, this publication forming an integral part of the present description.

Figure 7:
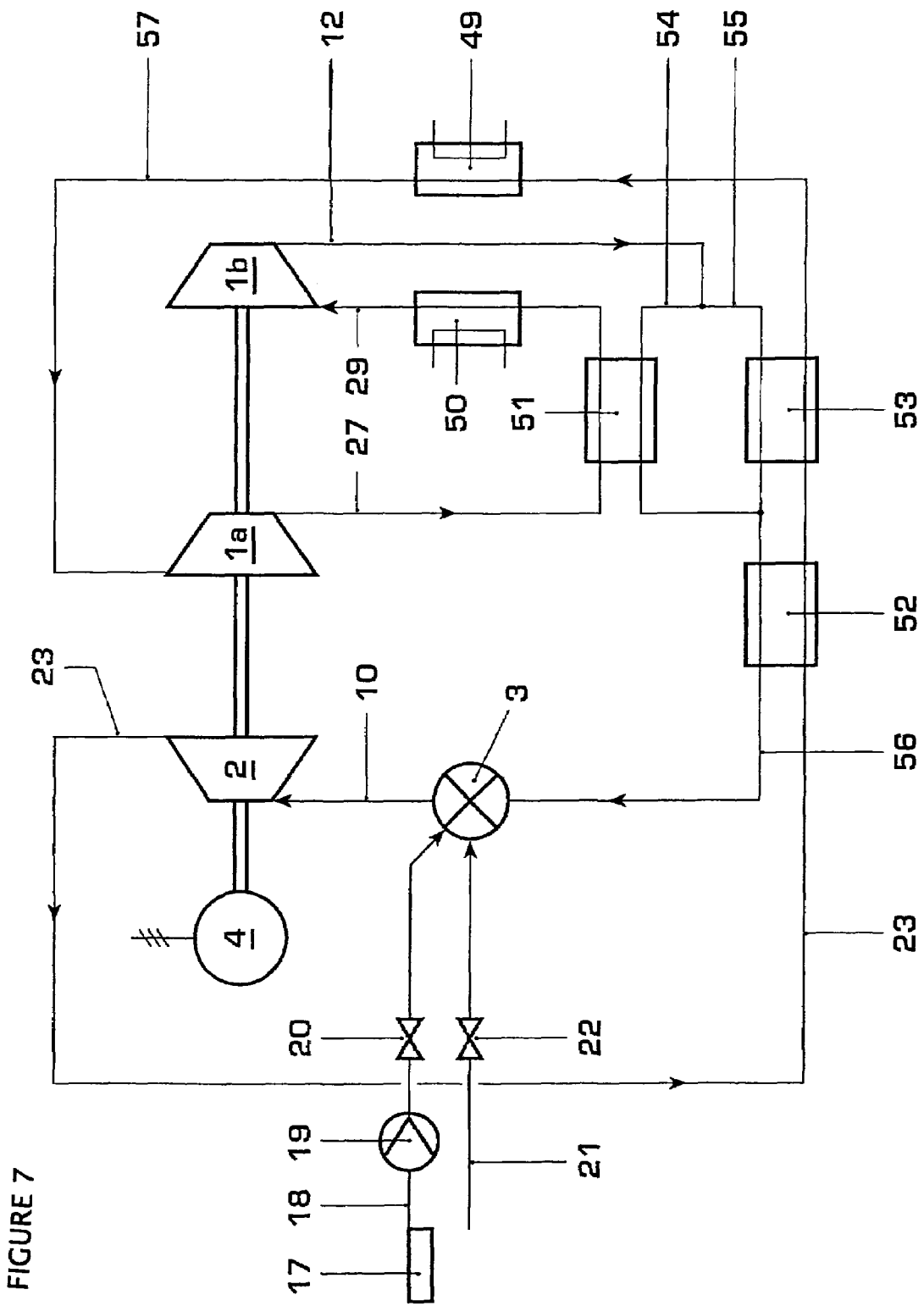
FIG. 7 shows a further gas turbine setup with a plurality of recuperators and intermediate coolers.

FIG. 7 shows a partly closed gas turbine process which is charged with $CO_2$ and which is operated in such a way that the fuel 21, here as $CH_4$, and the associated oxidant 18, here as $O_2$, are supplied to the combustion chamber 3, the aim here, too, being to separate at a suitable location the excess $CO_2$ which has occurred and the $H_2O$. The separated high-pressure $CO_2$ can then easily be condensed by cooling ($T_k=31°$ C., $p_k=74$ bar), thus making it possible to dispose of it easily on the ocean floor. $CO_2$ is a relatively heavy gas. Its specific heat changes, in the semiideal gas state, from $c_p$ 0.84 at 15° C. to $c_p=1.235$ kJ/kg° C., so that the isentropic exponent κ falls from 1.29 at 15° C. to κ=1.181 at 1000° C. This property results in very high pressure ratios for maximum specific work and maximum efficiency. The values are above those for air by a factor of 4. It is therefore advantageous, in such a setup, to provide for the introduction of an intermediate cooler and a recuperator. A low pressure ratio of about 5 at 700° C. is then obtained here. Furthermore, in these terms, it must be remembered that, because of the substantially lower sound velocity of $CO_2$, as compared with air, in particular the compressor must be designed for a lower circumferential velocity than is normally customary for air. In FIG. 7, the first precompressor stage 1a (LP compressor) is still in the undistorted gas, whilst the downstream intermediate cooler 50 is near the gas/steam/liquid boundary curve and, as a function of pressure, has extremely high specific heat. The precompressed circulation medium 27 then flows through a recuperator 51 and, subsequently, the intermediate cooler 50 already mentioned, before it flows into the second compressor stage 1b, in which final compression is carried out. In cooperation with this intermediate cooler 50, the excess $CO_2$ from the process can be extracted in liquid form in a very simple way by means of moderate further cooling or heat discharge. Advantageously, for this intended use, the isobaric section in the region of the intermediate cooler 50 can be displaced into the wet zone, so that the excess $CO_2$ is then already condensed. For this purpose, it is necessary to have available cold cooling water which, if possible, is at a temperature of less than 20° C. The finally compressed circulation gas 12 then flows via parallel lines 54, 55 through recuperators 51, 53, likewise connected in parallel, in which combined intermediate preheating takes place. Final preheating of the circulation gas 56 then takes place in a downstream recuperator 52, through which the exhaust gases 23 from the turbine 2 flow. Furthermore, these exhaust gases 23 are also relevant to the recuperator 53 already mentioned, whereas the recuperator 51, connected in parallel to the lastmentioned recuperator 53, has only the precompressed circulation gas 27 flowing through it. On the outflow side of the recuperators 52, 53, through which the exhaust gases 23 flow, a further intermediate cooler 49 is arranged, before the cooled circulation gas 57 flows into the precompressor stage 1a again, the result of this being, then, that the circuit is considered to be closed.

Figure 8:
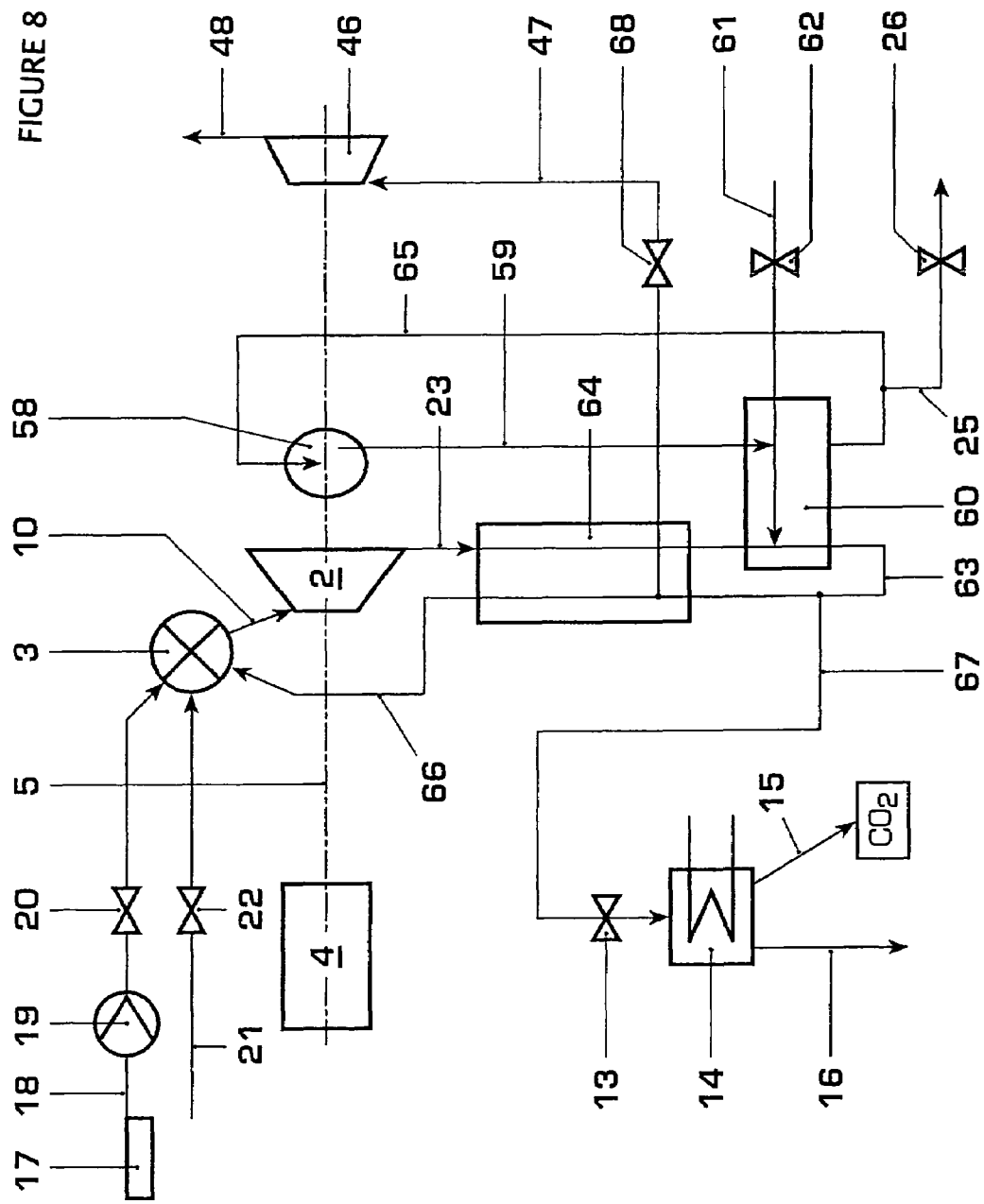
FIG. 8 shows a gas turbine process with an isothermal compressor and with recuperation.

FIG. 8 shows a gas turbine process with a downstream steam circuit, here the setup being extended by an isothermal compressor and recuperation. Here, in a preferred version, this setup makes use of an isothermal compressor 49 operated by pressurized water or a gradient. On account of its intensive heat exchange, this isothermal compressor can at the same time perform the function of the recooler. There is therefore no need for a bladed conventional compressor. In such an isothermal compressor which is preferably used, circulation gas can be converted into a precompressed state within the framework of isothermal compression, in which the circulation gas can be comparatively highly compressed, without reaching high compression temperatures, so that, in the extreme case, said gas is available directly for driving the gas turbine, at least with a conventional compressor being avoided and therefore without the need to drive the compressor by means of the turbine. This isothermal compression ensures that the maximum possible heat supply does not decrease with an increasing pressure ratio. The power density therefore remains high even in the case of a high pressure ratio. Moreover, recuperation is always possible. It is, of course, possible to deliver isothermally precompressed circulation gas to a conventional high-pressure compressor stage. Such an isothermal compressor then offers improved properties as regards utilizing the waste heat from the exhaust gases emerging from the turbine, especially since the temperature level of the highly compressed air, after it has emerged from a high-pressure compressor stage possibly located downstream of isothermal compression, is lower than in the case of compressors of conventional gas turbine plants. In a preferred version of this isothermal compressor, in combination with an energy-generating gas turbine, as may be gathered from FIG. 7, a vertically running flow duct is provided, which has an upper inlet region and a lower outlet region, the diameter of the flow duct being greater in the region of the inlet than the diameter in the region of the outlet. Arranged in the inlet region of the flow duct is a water-atomizing nozzle arrangement which generates as great a number of very small water drops as possible in a large quantity. In the case of water atomization in the inlet region of the flow duct, it is likewise necessary to ensure that the atomized water is thoroughly mixed with the circulation gas. Due to gravitation, the circulation gas/water mixture generated in this way falls through the flow duct, the inner contour of which is designed in such a way that the region near the inlet orifice has a largely uniform cross-sectional area along the vertical extent of the flow duct, so that the velocities of the flow of the circulating gas and of the falling cloud of drops are equated as quickly as possible by pulse transmission. As soon as the circulation gas/water mixture has reached a specific falling velocity of 6 to 12 m/s, the cross section of the flow duct decreases in the direction of fall, so that the relative velocity difference between the cloud of drops and the circulation gas remains approximately constant. Without being braked, the cloud of drops would be accelerated downward by gravitational acceleration. The velocity v would increase quickly according to the formula $v=\sqrt{2g(x+x_0)}$, g denoting the gravitational acceleration and x being the downwardly directed coordinate. $x_0$ is the constant which corresponds approximately to the starting point of the free falling movement. If the circulation gas were also to execute a free fall, the cross-sectional area of the compression well would have to obey the law of conservation of volume $A=\sqrt{\{x_0/(x+x_0)\} \cdot A_0}$, $A_0$ denoting the cross-sectional area at the start of the fall well and A the cross-sectional area at any point. However, the cross section of the fall well is narrowed somewhat more slowly, as compared with the lastmentioned formula. In this case, the profile of the narrowing is selected as just sufficient to ensure that the braking action of the circulation gas on the cloud of drops leads to a constant relative velocity difference between the drops and the circulation gas. Thus, as a result of the reduction in flow cross section, the circulation gas enclosed between the water drops experiences, according to Bernoulli, a pressure increase which corresponds to isothermal compression. Finally, the isothermally compressed circulation gas/water mixture passes through the outlet orifice of the flow duct into a collecting tank or high-pressure chamber which is provided directly at the outlet orifice and in which water is separated from the compressed circulation gas.

Such isothermal compression is explained in more detail with reference to the example according to FIG. 8, this being based on a driven water supply instead of on the process described above.

As regards the technical and physical aspects of $CO_2$ as a circulation gas in terms of temperature and pressure for optimum condensation, reference is made to the statements relating to FIG. 7.

Here, in contrast to the statements made above, the provision of the compressed circulation gas is initiated by a water pump 58 which is located on the turbine rotor shaft 5, that is to say is driven by the turbine 2. The water 59, brought to pressure, flows into an injector 60, in which compression of the exhaust gas 23 from the turbine 2, said exhaust gas previously having been cooled by means of a recuperator 64, takes place. The expanded water 65 then flows from here back into the pump 58 again. Air 61 flowing via a regulating member 62 is simultaneously provided, in this injector, for starting the process. The compressed circulation gas 63 then flows through the recuperator 64, already mentioned, and there absorbs the heat discharged by the exhaust gases 23, before said gas then flows as treated circulation gas 66 into the combustion chamber. A part quantity 67 of the circulation gas 63 compressed in the injector is branched off upstream of the recuperator 64 and led through a cooler 14, in which the condensation of the $CO_2$ takes place in the way already described. The discharge 15 of the condensed $CO_2$ and of the parasitic gases 16 is subsequently carried out. The remaining elements of this figure correspond to the setup according to FIG. 5, here the steam line 47 from the recuperator 64 also being equipped with a regulating member 68.

Figure 9:
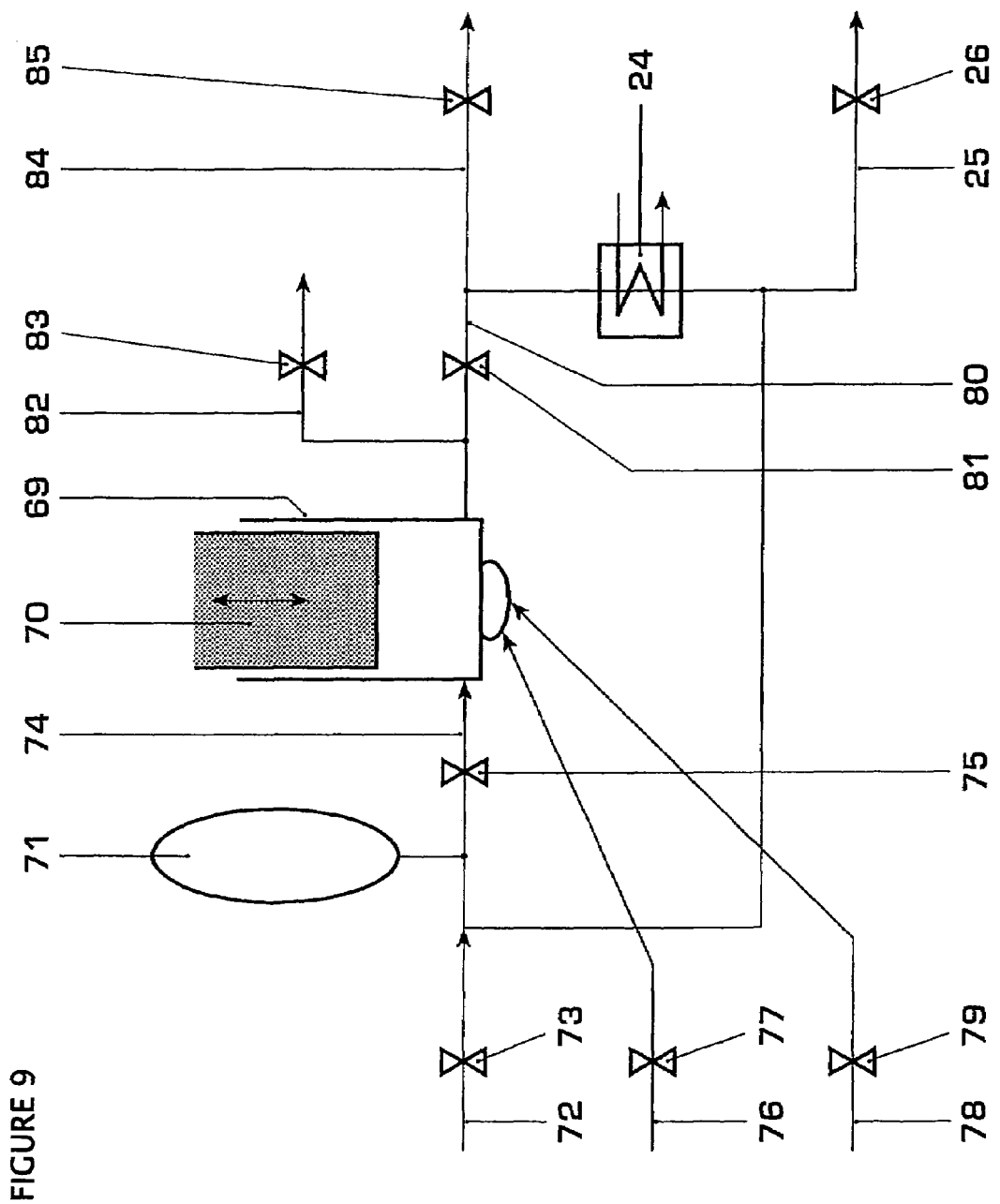
FIG. 9 shows a piston engine process with a final purpose according to one of the preceding setups.

FIG. 9 shows a setup which is based on a piston engine 69/70. Engines having a multipiston system may, of course, also be used here. During the intake stroke, the piston 70 moves upward, and a recirculation gas is sucked in from the line 74 and/or from the storage volume 71, during the start itself air 72 being sucked in from the surroundings. These operations during intake or starting are controlled by means of corresponding regulating members 73, 75. During the compression phase, the piston 70 closes (piston 70 downward). In the course of the work cycle, the separately compressed fuel 78 is injected by means of the regulating member 79 and oxygen 76 by means of the regulating member 77 in a near-stoichiometric ratio, being ignited spontaneously or by spark, depending on the pressure ratio, with the result that expansion (piston 70 upward) is initiated. During subsequent ejection, the piston 70 moves downward; in the operating mode with recirculation, only the valve 81 to the cooler is open. During starting, first the piston engine is started up and ignited and then the exhaust gas valve 85 is throttled, with the result that the recirculation line 80 and its branch 84 are supplied with exhaust gas. The air intake valve 73 is also gradually throttled and recirculation is enriched with circulation gas predominantly consisting of $CO_2$. Finally, the two valves 73, 85, which are operatively connected during starting, are closed completely and the engine is in the recirculation mode. The excess circulation gas, namely $CO_2$, can be extracted from the cycle basically in two ways: at the lowest pressure level via a line 82, which is provided with a regulating member 83 and which branches off from the ejection string, or by means of a valve, not shown in any more detail in the figure, which is arranged upstream of the cooler 24. Another possibility for extracting the excess circulation gas from the cycle is to branch it off under pressure in a suitable section of the compression cycle, recool it and condense it. The circulation gas extracted in this case contains only a little water to be discharged, insofar as the setup has good dewatering 25/26 downstream of the cooler 24. In contrast to a conventional plant, this piston engine does not require any charging in order to achieve a power increase. If less excess gas is extracted from the closed or quasi closed circuit, the process pressure in the return through the line 74 and in the storage volume 71 rises automatically, and vice versa. As already mentioned, the engine present here also needs a hydrocarbon or hydrogen as fuel and, correspondingly, also oxygen, either in the pure form or as oxygen-enriched air. In the case of operation with relatively pure oxygen, no nitrogen enters the flame, with the result that $NO_x$ formation, known in piston engines, is eliminated completely.

Obviously, numerous modifications and variations of the present invention are possible in the light of the above teachings. It is therefore to be understood that, within the scope of the appended claims, the invention may be practiced otherwise than as specifically described herein.

What is claimed as new and desired to be secured by Letters Patent of the United States is:

1. A method for operating a power plant including a CO2 process, the method comprising the steps of:
    compressing a working fluid into a circulation gas, a first secondary stream and a second secondary stream;
    heating the circulation gas at a constant pressure, heating the circulation gas at a constant volume, or both;
    expanding the circulation gas at a constant entropy;
    discharging heat from the circulation gas at a constant pressure, discharging heat from the circulation gas at a constant volume, or both;
    introducing the first secondary stream to an input side of a turbine; and
    regulating the degree of charging of the process at the input side of the turbine by controlling discharge of the second secondary stream to extract CO2; and
    the CO2 process comprising internal combustion of a fuel and an oxidant necessary for oxidation.

2. The method as claimed in claim 1, further comprising:
    condensing excess water and CO2; and
    separating the condensed water and CO2 out from the process.

3. The method as claimed in claim 2, further comprising:
    condensing out a CO2 part quantity from the process in a cooler.

4. The method as claimed in claim 3, further comprising:
    separating out parasitic gases occurring in the process downstream of the cooler.

5. The method as claimed in claim 1, further comprising:
    starting up the power plant by the connection of an air startup flap acting upstream of compression.

6. The method as claimed in claim 1, wherein in the compression step and the expansion step, the entropy of the circulation gas remains approximately constant.

7. The method of claim 1, wherein the second secondary stream is branched off from the first secondary stream.

8. The method of claim 1, wherein the regulating step comprises regulating the power of the process by extracting CO2 by means of a regulating means regulating the discharge of the second secondary stream.

* * * * *